US008774842B2

(12) United States Patent
Jones et al.

(10) Patent No.: US 8,774,842 B2
(45) Date of Patent: Jul. 8, 2014

(54) SYSTEM AND METHOD FOR LIMITING USAGE OF A WIRELESS COMMUNICATION DEVICE

(75) Inventors: Miles Jones, San Rafael, CA (US); Michael J. Vrhel, Sammamish, WA (US)

(73) Assignee: Artifex Software Inc., San Rafael, CA (US)

( * ) Notice: Subject to any disclaimer, the term of this patent is extended or adjusted under 35 U.S.C. 154(b) by 54 days.

(21) Appl. No.: 13/401,733

(22) Filed: Feb. 21, 2012

(65) Prior Publication Data

US 2013/0178234 A1 Jul. 11, 2013

Related U.S. Application Data

(60) Provisional application No. 61/585,524, filed on Jan. 11, 2012.

(51) Int. Cl.
*H04W 24/00* (2009.01)
(52) U.S. Cl.
USPC ............... 455/456.4; 455/419; 455/404.1
(58) Field of Classification Search
USPC ............... 455/456.4, 456.1, 414.1, 418, 404
See application file for complete search history.

(56) References Cited

U.S. PATENT DOCUMENTS

2004/0209594 A1* 10/2004 Naboulsi .................... 455/404.1
2013/0084847 A1* 4/2013 Tibbitts et al. ............... 455/419

* cited by examiner

*Primary Examiner* — Chuong A Ngo
(74) *Attorney, Agent, or Firm* — O'Melveny & Myers LLP

(57) ABSTRACT

A system and method is provided for limiting or disabling cellular telephone usage during operation of a motor vehicle. In one embodiment of the present invention, the system includes a wireless transmission device and a cell phone. The wireless transmission device, which includes at least an IR modulation circuit, a processor, and a memory device, is configured to transmit a wireless signal toward a driver of the motor vehicle. The cell phone, which includes at least an IR modulation detection circuit, a processor, a memory device, a keypad, and a display, is configured to receive the wireless signal and, in response thereto, limit or disable certain features of the cell phone. This can be done by disabling certain features (e.g., cellular service, Bluetooth™, telephone calls, text messaging, emailing, its antenna, its keyboard, and/or its display) or disabling (e.g., powering down, etc.) the entire cell phone.

20 Claims, 4 Drawing Sheets

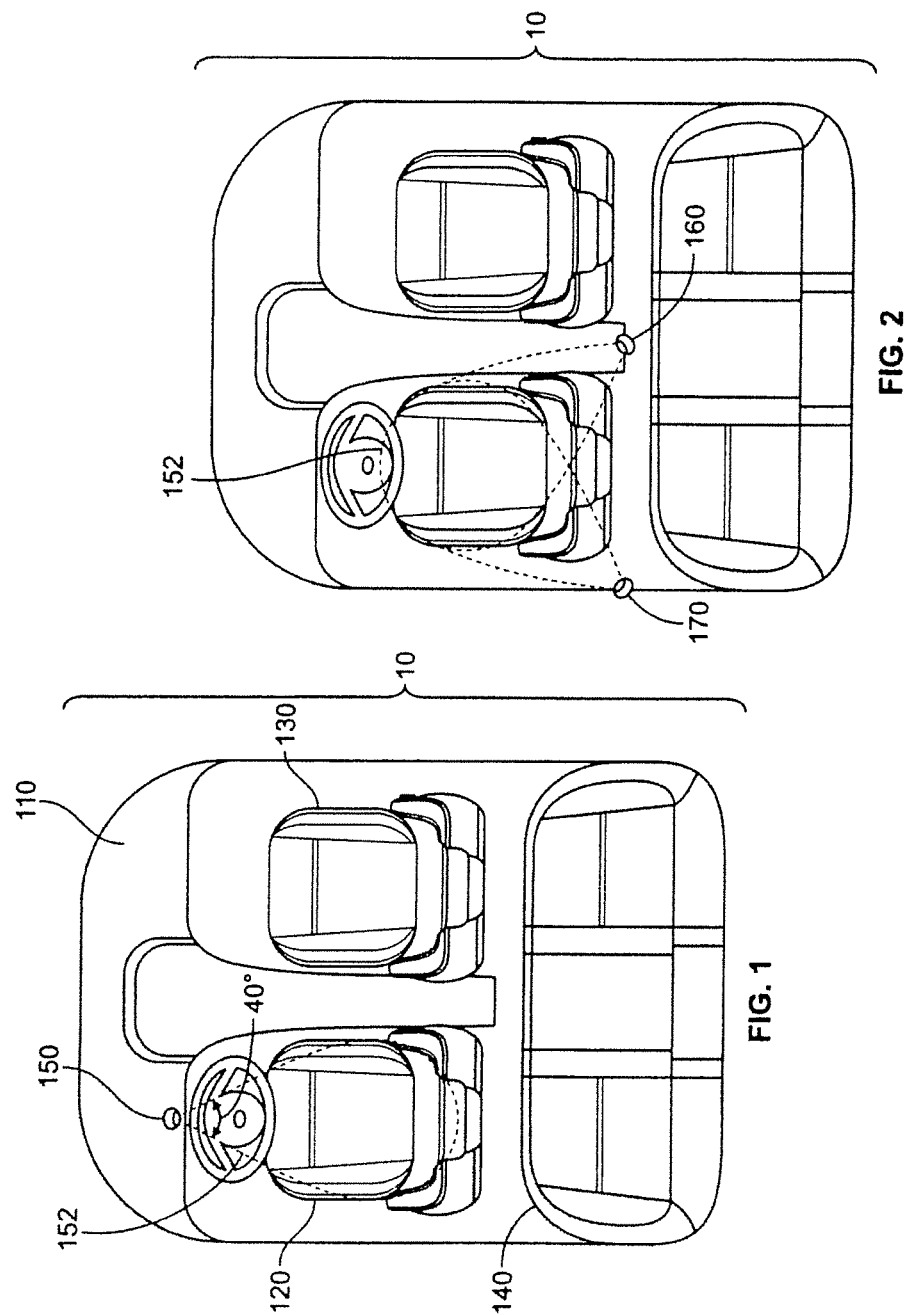

Relative Luminosity (a.u.)

SYSTEM AND METHOD FOR LIMITING USAGE OF A WIRELESS COMMUNICATION DEVICE

CROSS-REFERENCE TO RELATED APPLICATION

This application claims priority pursuant to 35 U.S.C. §119(e) to U.S. provisional patent application Ser. No. 61/585,524, filed Jan. 11, 2012, the subject matter of which is incorporated by reference herein in its entirety.

BACKGROUND OF THE INVENTION

1. Field of the Invention

The present invention relates to a wireless communication device, and more particularly, to a system and method for limiting or disabling usage of a wireless communication device during operation of a motor vehicle.

2. Description of Related Art There have been a number of studies that have shown that it is dangerous to operate a motor vehicle while using a wireless communication device, such as a cellular telephone ("cell phone") or a personal digital assistance ("PDA"). In fact, recently the National Traffic Safety Board ("NTSB") has released a recommendation that the States disallow the use of cell phones by drivers of motor vehicles. The recommendation, which was based on ten years of investigations into distraction-related accidents, not only urged a ban on hand-held cell phones, but also a ban on hands-free cell phones. This is because, according to the Insurance Institute for Highway Safety, there is a large body of evidence showing that talking on a phone, whether hand-held or hands-free, impairs driving and increases ones risk of getting into an automobile accident. Currently, nine States have banned the use of hand-held cell phones and 35 States have banned texting by drivers. It is likely that more States will adopt restrictions, and it is possible that a complete ban on cell phone usage in vehicles could occur in the near future. However, if such a ban is adopted, enforcement measures will have to be implemented to ensure compliance by drivers of motor vehicles. The tragic cost of noncompliance is evident in the loss of life in accidents caused by cell phone usage while operating a vehicle.

While law enforcement officers can be used to police those who are violating wireless communication laws, such methods are generally ineffective. By way of example, it is hard for an officer to tell whether a driver is on a hands-free phone or merely singing along to a song on the radio. Therefore, there is a need to develop a low cost system and method for limiting, and in some instances disabling, usage of a wireless communication device during operation of a motor vehicle.

SUMMARY OF THE INVENTION

The present invention provides a system and method for limiting or disabling cellular telephone ("cell phone") usage during operation of a motor vehicle (e.g., an automobile, bus, truck or other heavy equipment (e.g., forklift, backhoe, etc.), train, or boat). Preferred embodiments of the present invention operate in accordance with a wireless transmission device and a cell phone, wherein the wireless transmission device is configured to transmit at least a wireless activation signal, and the cell phone is configured to receive the wireless activation signal and, in response thereto, limit or disable certain features of the cell phone.

In a first embodiment of the present invention, at least one infrared ("IR") light emitting diode ("LED"), which may be mounted in a dashboard of a vehicle, is used to direct a wireless signal toward a driver of the vehicle. If a cell phone receives the signal (e.g., is in a detection zone that is substantially around the driver of the vehicle), it may be configured to disable certain features of the cell phone (e.g., cellular service, Bluetooth, telephone calls, text messaging, emailing, its antenna, its keyboard, and/or its display). In doing so, it may limit (or disable) the way in which the driver of the vehicle can use their cell phone. For example, it may not allow the driver to make a telephone call, send (or compose) a text message, and/or send (or compose) an email. It also may not allow the driver to receive a telephone call, receive (or view) a text message, and/or receive (or view) an email. It should be appreciated, however, that the foregoing limitations may not be absolute limitations. For example, the driver may be permitted to communicate in certain emergency situations (e.g., to dial 911, etc.). Further, if certain features are not allowed to be performed while one is driving a car (e.g., using a hand-held cell phone to make a telephone call or send a text), then the driver may be permitted to communicate using another (legal) form of communication (e.g., making a hands-free phone call, sending a hands-free text message, etc.). By way of another example, certain States may only make it illegal to communicate via cell phone while the vehicle is in a particular state (e.g., running, moving, etc.). In such situations, the vehicle may be configured to only transmit the wireless signal if the vehicle is running (e.g., the engine is on, etc.), moving (e.g., the vehicle is in drive, the vehicle is not in park, the vehicle is moving, etc.), etc.

In a second embodiment of the present invention, at least two IR LEDs are used to direct wireless signals toward a driver of a vehicle. This embodiment differs from the first embodiment in that the wireless signals are transmitted in a forward direction, away from the passengers of the vehicle. This embodiment is advantageous over the first embodiment in that the detection zone can be (at least more easily) tailored so that it does not extend (at least substantially) beyond the driver's front seat. In accordance with this embodiment, the IR LEDs can be mounted, for example, in the driver's seat, center console, door panel, and/or headliner.

As discussed above, the present invention preferably includes a wireless transmission device in communication with a cell phone. In one embodiment of the present invention, the wireless transmission device includes an IR modulation circuit, a processor, and a memory device, wherein the processor is used to control the voltage modulation device and to generate the modulated IR signal. The cell phone includes an IR modulation detection circuit, a processor, a memory device, a keypad, and a display, wherein the IR modulation detection circuit is used to detect a wireless signal, and the processor is configured to use the wireless signal to limit usage of the cell phone. This can be done by disabling certain features (e.g., cellular service, Bluetooth™, telephone calls, text messaging, emailing, its antenna, its keyboard, and/or its display) or disabling (e.g., power down, etc.) the entire cell phone. The processor may do this by disabling certain features in firmware (or software) or disabling various components (e.g., turning off the antenna, disabling the keyboard, disabling the display, etc.).

In one embodiment of the present invention, the cell phone is further (or alternatively) configured to receive a signal via a wired connection (e.g., USB, etc.). By way of example, a cell phone may be configured to disable a first set of features (e.g., phone calls, text messaging, and emailing) when it receives a wireless signal and disable a second set of features (e.g., text messaging and emailing) when the cell phone is plugged into a USB port of the vehicle (i.e., receives a signal via a wired connection). Such a system could be used to disable the driver's cell phone when it is not plugged into the USB port, and allow only hands-free calling when the cell phone is plugged into the USB port.

A method of transmitting a wireless signal in accordance with one embodiment of the present invention includes determining whether the vehicle is in a restricted state, and if it is, transmitting a wireless signal (e.g., a modulated IR signal, etc.). A method of receiving a wireless signal in accordance with one embodiment of the present invention includes determining whether a particular wireless signal is received, and if it is, disabling at least one feature of the cell phone. For example, as discussed, above, the cell phone could be configured to disable cellular service, Bluetooth™, hand-held phone service, hands-free phone service, texting, emailing, the antenna, the keyboard, the display, etc.

A more complete understanding of a system and method for limiting or disabling cell phone usage during operation of a motor vehicle will be afforded to those skilled in the art, as well as a realization of additional advantages and objects thereof, by a consideration of the following detailed description of the preferred embodiment. Reference will be made to the appended sheets of drawings, which will first be described briefly.

BRIEF DESCRIPTION OF THE DRAWINGS

FIG. 1 illustrates the transmission of a wireless signal having a limited beam width in accordance with a first embodiment of the present invention;

FIG. 2 illustrates the transmission of wireless signals having limited beam widths in accordance with a second embodiment of the present invention;

DETAILED DESCRIPTION OF THE PREFERRED EMBODIMENT

The present invention provides a system and method for limiting cell phone usage during operation of a motor vehicle. It should be appreciated, however, that while the invention is described herein in terms of a cell phone in a vehicle environment, the invention is not so limited, and can be used to limit or disable any electronic wireless or wired device (e.g., PDA, portable computer, IPAD™, IPOD™, navigation device, Bluetooth™ earpiece, etc.) in any environment. In the detailed description that follows, like element numerals are used to describe like elements illustrated in one or more figures.

Figure 3:
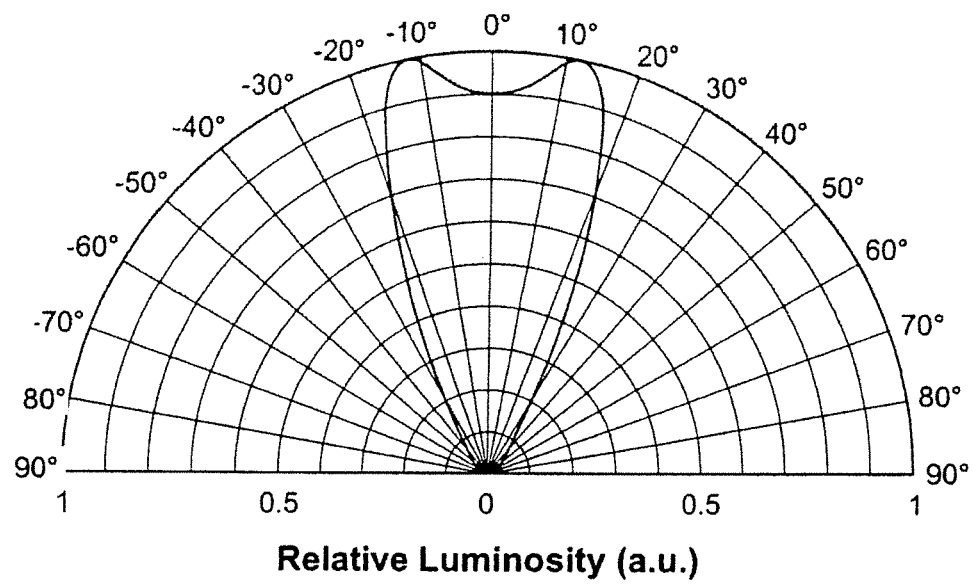
FIG. 3 illustrates an exemplary beam width of the wireless signals illustrated in FIGS. 1 and 2.

As shown in FIG. 1, at least one infrared ("IR") light emitting diode ("LED") 150, which may be mounted in a dashboard 110 of a vehicle 10, is used to direct a wireless signal toward a driver of the vehicle 120. In one embodiment of the present invention, the wireless signal is configured to limit usage of a cell phone that is located in a detection zone 152 that is substantially around the driver of the vehicle 120. By way of example, the detection zone 152 may be roughly 0.9 meters in length by 0.6 meters in width with a 20-30° angle of incidence (see, e.g., FIG. 3). By generating a detection zone 152 that is only around the driver of the vehicle 120, passengers in the vehicle (e.g., front passenger 130 and rear passengers 140) may be permitted to use their cell phones in a non-limited manner. It should be appreciated, however, that the present invention is not limited to the transmission of an IR LED wireless signal, and that other wireless (e.g., Bluetooth™, RF, etc.) and wired signals are within the spirit and scope of the present invention. While an IR signal is preferred (e.g., due to its limited beam width), other types of signals could be configured (e.g., via a wired connection, addressing, signal strength, shielding, etc.) to communicate with a cell phone belonging to the driver of the vehicle. It should also be appreciated that the present invention is not limited to a detection zone that is substantially around the driver of the vehicle, and may include other detection zones (e.g., one that encompasses (at least substantially) the front compartment of the vehicle, one that encompasses (at least substantially) the entire interior of the vehicle, etc.).

As discussed above, the wireless signal is used to limited usage of the driver's cell phone. By way of example, this can be done by using a cell phone that is configured (e.g., by the factory, as required by State law, etc.) to receive and process such a signal. In particular, the cell phone may be configured to receive the signal and to disable at least one feature in response thereto. For example, the cell phone may disable certain features (e.g., cellular service, Bluetooth, telephone calls, text messaging, emailing, its antenna, its keyboard, and/or its display) or it may disable (e.g., power down, etc.) the entire cell phone. In doing so, it may limit (or disable) the way in which the driver of the vehicle can use their cell phone. For example, it may not allow the driver to make a telephone call, send (or compose) a text message, and/or send (or compose) an email. It also may not allow the driver to receive a telephone call, receive (or view) a text message, and/or receive (or view) an email. It should be appreciated, however, that the foregoing limitations may not be absolute limitations. For example, the driver may be permitted to communicate in certain emergency situations (e.g., to dial 911, etc.). Further, if certain features are not allowed to be performed while one is driving a car (e.g., using a hand-held cell phone to make a telephone call or send a text), then the driver may be permitted to communicate using another (legal) form of communication (e.g., making a hands-free phone call, sending a hands-free text message, etc.). By way of another example, certain States may only make it illegal to communicate via cell phone while the vehicle is in a particular state (e.g., running, moving, etc.). In such situations, the vehicle may be configured to only transmit the wireless (limiting/disabling) signal if the vehicle is running (e.g., the engine is on, etc.), moving (e.g., the vehicle is in drive, the vehicle is not in park, the vehicle is moving, etc.), etc. Those of ordinary skill in the art will understand that sensors and similar technology can be used to determine the state of the vehicle.

As shown in FIG. 2, at least two IR LEDs 160, 170 are used to direct wireless signals toward a driver of a vehicle. The embodiment of FIG. 2 differs from FIG. 1 in that the wireless signals are transmitted in a forward direction, away from the passengers of the vehicle. The embodiment of FIG. 2 is advantageous over the embodiment of FIG. 1 in that the detection zone 152 can be (at least more easily) tailored so that it does not extend (at least substantially) beyond the driver's front seat. In accordance with this embodiment, the IR LEDs 160, 170 can be mounted, for example, in the driver's seat, center console, door panel, and/or headliner.

Figure 4:
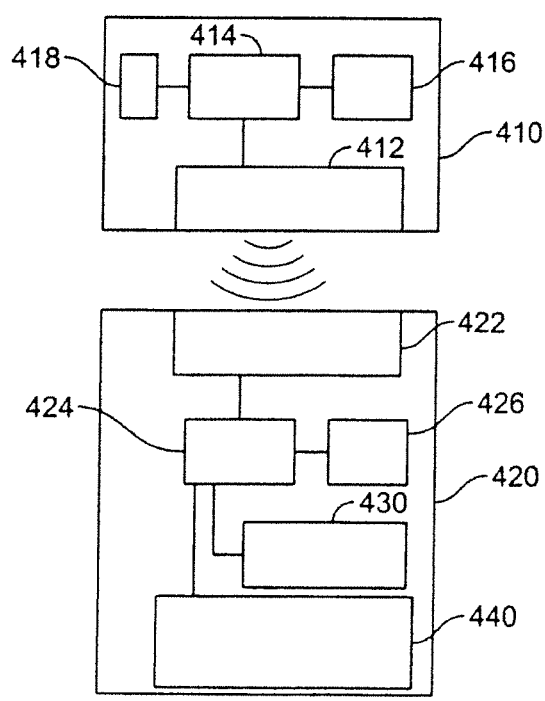
FIG. 4 illustrates a system for limiting usage of a wireless communication device in accordance with one embodiment of the present invention.

FIG. 4 illustrates a system for limiting usage of a cell phone in accordance with one embodiment of the present invention. Specifically, the system includes a wireless transmission device 410 in communication with a cell phone 420, wherein the wireless transmission device 410 (which may be installed, for example, in a vehicle) (see, e.g., FIGS. 1 and 2) includes an IR modulation circuit 412, a processor 414, a memory device 416, and a sensor 418, and the cell phone 420 includes an IR modulation detection circuit 422, a processor 424, a memory device 426, a keypad 430, and a display 440.

Figure 5:
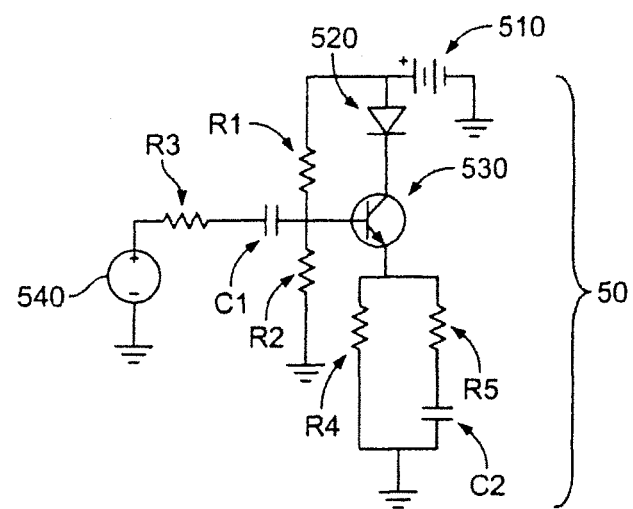
FIGS. 5 and 6 illustrate systems for generating the wireless signals illustrated in FIGS. 1 and 2.
Figure 6:
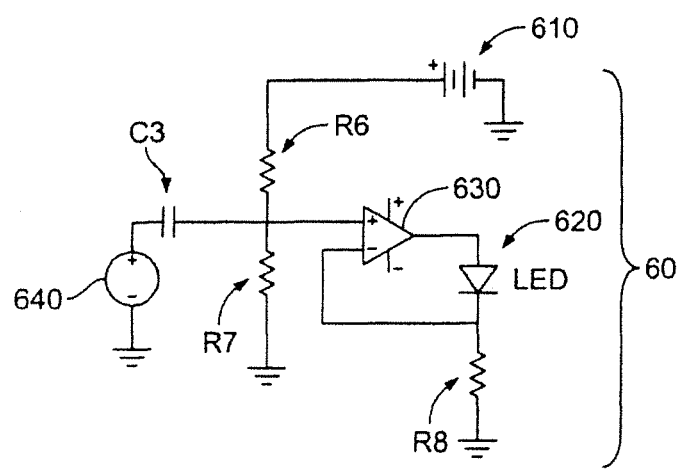

FIG. 5 illustrates one embodiment of an IR modulation circuit 50 which includes a power source 510, an LED 520, at least one resistor (i.e., R1-R5), at least one capacitor C1, C2, a transistor 530, and a voltage modulation device 540. The voltage modulation device 540 can be controlled to draw current through the LED 520, thereby generating a modulated IR signal. FIG. 6 illustrates another embodiment of an IR modulation circuit 60 which includes a power source 610, an LED 620, at least one resistor (i.e., R6-R8), at least one capacitor C3, an op-amp 630, and a voltage modulation device 640. As with FIG. 5, the voltage modulation device 640 can be controlled to draw current through the LED 620, thereby generating a modulated IR signal.

Referring back to FIG. 4, the processor 414, which may be configured to run firmware (or software) stored in the memory device 416, may be used to control the voltage modulation device and to generate the modulated IR signal. In a preferred embodiment, the processor is configured to generate the modulated IR signal when the vehicle is in a restricted state. The state of the vehicle can be determined from the sensor 418, which may include, for example, a mechanical and/or electrical sensor configured to determine whether the vehicle's transmission is in gear, the vehicle is moving (either forward or backward), the vehicle's speed is at or above a predetermined speed, and/or the vehicle is in a restricted location (e.g., in restricted State, on a restricted road, etc.). It should be appreciated that the present invention is not limited to the wireless transmission device 410 illustrated in FIG. 4. For example, a wireless transmission device that includes additional components (e.g., a switch (e.g., operatively connected to the processor) for controlling the power source based on the state of the vehicle, etc.) is within the spirit and scope of the present invention. By way of another example, an IR modulation circuit that is an off-the-shelf LED driver chip (e.g., Atmel ATtiny28 circuit, etc.) is also within the spirit and scope of the present invention.

With reference to FIG. 4, the cell phone 420 is configured to limit its usage if a wireless signal (e.g., a properly modulated IR signal) is received. Specifically, after the IR modulation detection circuit 422 detects a wireless signal, the processor 424, which may be configured to run firmware (or software) stored in the memory device 426, is configured to limit usage of the cell phone. This can be done by disabling certain features (e.g., cellular service, Bluetooth™, telephone calls, text messaging, emailing, its antenna, its keyboard, and/or its display) or disabling (e.g., power down, etc.) the entire cell phone. The processor may do this by disabling certain features in firmware (or software) or disabling various components (e.g., turning off the antenna (not shown), disabling the keyboard 430, disabling the display 440, etc.). It should be appreciated that the present invention is not limited to the cell phone 420 illustrated in FIG. 4. By way of example, a cell phone that includes additional (or different) components is within the spirit and scope of the present invention. For example, the IR modulation detection circuit 422 could be any circuit, as known to those skilled in the art, capable of detecting a wireless signal (e.g., a properly modulated IR signal, etc.). The IR modulation detection circuit 422 could also be an off-the-shelf IR receiver chip, such as the Atmel ATA2536T low-voltage IR receiver chip.

It should also be appreciated that while the IR modulation detection circuit has been described in terms of a circuit for detecting a particular wireless signal (e.g., an activation signal), the present invention is not so limited. For example, the wireless transmission device and the cell phone could be configured to transmit and receive, respectively, different wireless signals (e.g., IR signals of different modulation, Bluetooth™ signals having different payloads, etc.), where each wireless signal corresponds to a different function. For example, a first wireless signal could be used to initiate (or initialize) the cell phone (e.g., identify a particular protocol or standard that the vehicle complies with, etc.), a second wireless signal could be used to disable a first set of features (e.g., if the vehicle is in a first state (e.g., park, running, operating at or above a particular speed, etc.), if the vehicle is registered or located in a State that does not allow the first set of features if the cell phone operator is also operating a motor vehicle, etc.), a third wireless signal could be used to disable a second set of features (e.g., if the vehicle is in a second state, if the vehicle is registered or located in a State that does not allow the second set of features if the cell phone operator is also operating a motor vehicle, etc.), and a fourth wireless signal could be used to provide additional information to the cell phone (e.g., identify the state of the vehicle, identify the State in which the vehicle is registered or located in, provide GPS information on the vehicle, etc.). Further, the cell phone and the wireless transmission device could also be configured to transmit and receive, respectively, at least one wireless signal. For example, a first wireless signal could be used to acknowledge the reception of a wireless signal from the vehicle, a second wireless signal could be used to enable or disable a particular set of features on the vehicle (e.g., enable hand-free phone calls, disable the wireless transmission device, etc.), and a third wireless signal could be used to provide additional information to the vehicle (e.g., the make and/or model number of the cell phone, the protocols or standards that the cell phone supports, etc.). Any of the foregoing signals could then be used to disable, enable or limit certain wireless communication features, regardless of whether the features are being carried out through the cell phone alone, or through a combination of the cell phone and the vehicle's hands-free communication system. For example, GPS information (e.g., as received by a GPS device in the cell phone, as received by a GPS device in the vehicle and transmitted to the cell phone, etc.) could be used, either alone or together with other information (e.g., information on a state of the vehicle, etc.), to limit or disable usage of the cell phone.

As discussed above, the present invention is also not limited to a cell phone configured to receive/process an IR signal. For example, a cell phone that is further (or alternatively) configured to receive a signal via a wired connection (e.g., USB, etc.) is also within the sprit and scope of the present invention. By way of example, a cell phone could be configured to disable a first set of features (e.g., phone calls, text messaging, and emailing) when it receives a wireless signal and disable a second set of features (e.g., text messaging and emailing) when the cell phone is plugged into a USB port of the vehicle (i.e., receives a signal via a wired connection). Such a system could be used to disable the driver's cell phone when it is not plugged into the USB port, and allow only hands-free calling when the cell phone is plugged into the USB port. It should be appreciated that if a wired connection is used, the cell phone could either be configured to ignore the wireless signal once it receives a wired signal, or the vehicle could be configured to cancel (i.e., cease transmission of) the wireless signal once the cell phone is connected to the wired connection.

Figure 7:
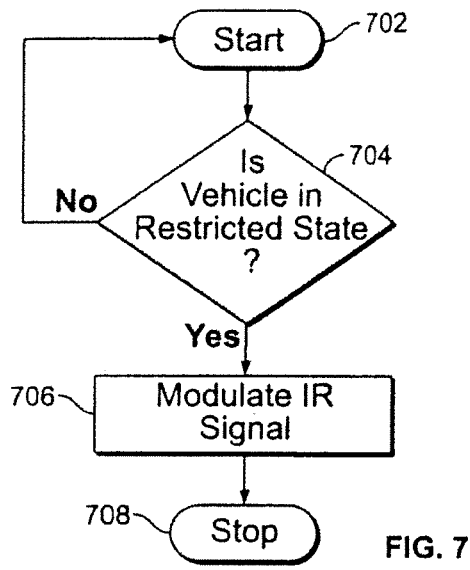
FIG. 7 illustrates a method for generating/transmitting a wireless signal in accordance with a preferred embodiment of the present invention.

A method of generating/transmitting a wireless signal in accordance with a preferred embodiment of the present invention is illustrated in FIG. 7. The method, which starts at step 702, determines whether the vehicle is in a restricted state at step 704. The restricted state could be, for example, the vehicle being in drive, the vehicle not being in park, the vehicle moving, the vehicle traveling above a predetermined speed, the engine running, etc. If the vehicle is not in a restricted state, then the process starts over at step 702, and no wireless signal (or a differently modulated IR signal) is transmitted. If, however, the vehicle is in a restricted state, then a wireless signal (e.g., a modulated IR signal, etc.) is generated and transmitted at step 706, stopping the process at step 708. It should be appreciated that the process illustrated in FIG. 7 may include additional (or different) steps, or steps that are performed in a different order. For example, instead of stopping at step 708, it could be determined whether the vehicle is in a restricted state. If it is then the wireless signal is generated and transmitted (again) at step 706. If it is not, then the process starts over at step 702, and no wireless signal (or a differently modulated IR signal) is transmitted.

Figure 8:
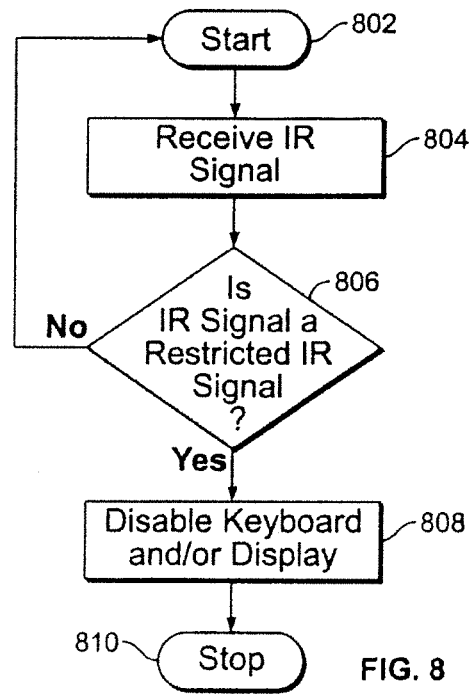
FIG. 8 illustrates a method for receiving/processing a wireless signal in accordance with a preferred embodiment of the present invention.

A method of receiving/processing a wireless signal in accordance with a preferred embodiment of the present invention is illustrated in FIG. 8. The method, which starts at step 802, determines whether a wireless signal (e.g., a properly modulated IR signal, etc.) is received at steps 804 and 806. If the wireless signal has not been received, then the process starts over at step 802. If, however, the wireless signal has been received, then at least one feature of the cell phone is disabled at step 808, ending the process at step 810. For example, as discussed, above, the cell phone could be configured to disabled cellular service, Bluetooth™, hand-held phone service, hands-free phone service, texting, emailing, the antenna, the keyboard, and/or the display. It should be appreciated that the process illustrated in FIG. 8 may include additional (or different) steps, or steps that are performed in a different order. For example, before disabling the at least one feature, it could be determined whether the cell phone is plugged into a wired connection (e.g., a USB port, etc.), or receiving a wired signal. If it is not, then at least one feature of the cell phone could be disabled at step 808. If it is plugged into the wired connection, then a different set of features could be disabled (e.g., disabling texting but not hands-free calling, etc.). By way of another example, instead of stopping at step 810, the process could loop-back to determine whether a wireless signal is received at steps 804 and 806. If a wireless signal is not received, then the cell phone (or a feature thereof) is re-enabled, and the process starts over at step 802. If a wireless signal is received, then the at least one feature of the cell phone is disabled (or remains disabled) at step 808, and the loop-back continues until a wireless signal is not received.

The foregoing description of a system and method for limiting cell phone usage during operation of a motor vehicle has been presented for the purposes of illustration and description. It is not intended to be exhaustive or to limit the invention to the precise forms disclosed, and many modifications and variations are possible in light of the above teachings. Those skilled in the art will appreciate that there are a number of ways to implement the foregoing features, and that the present invention it not limited to any particular way of implementing these features. The invention is solely defined by the following claims.

What is claimed is:

1. A system for limiting usage of a wireless communication device, comprising:
   a wireless transmission device mounted in a vehicle, comprising:
      at least one sensor configured to identify at least one state of the vehicle;
      an infrared (IR) modulation circuit configured to transmit a wireless IR signal in response to a control signal; and
      a first processor in communication with the IR modulation circuit and the at least one sensor, the first processor being configured to receive the at least one state of the vehicle from the at least one sensor, determine if the at least one state of the vehicle includes a restricted state, and if it does, transmit the control signal to the IR modulation circuit; and
   a wireless communication device comprising:
      a display;
      an IR modulation detection circuit for receiving the wireless IR signal; and
      a second processor in communication with the display and the IR modulation detection circuit, the second processor being configured to receive information from the IR modulation detection circuit and to disable at least one feature of the wireless communication device if the information indicates that the wireless IR signal has been received.

2. The system of claim 1, wherein the restricted state is at least one of a transmission of the vehicle being in gear, the vehicle moving in at least a forward direction, and the vehicle traveling at a speed that is above a predetermined speed.

3. The system of claim 1, wherein the wireless transmission device further includes a memory device for storing at least one program, wherein the at least one program is executed by the first processor to at least determine whether the vehicle is in the restricted state, and transmit the control signal to the IR modulation circuit if the vehicle is in the restricted state.

4. The system of claim 1, wherein the wireless communication device is a cellular telephone.

5. The system of claim 4, wherein the wireless communication device further includes a keyboard.

6. The system of claim 5, wherein the step of disabling at least one feature includes disabling the keyboard from being used to (i) initiate an outgoing phone call, (ii) compose a text, (iii) send a text, and (iv) receiving a text.

7. The system of claim 5, wherein the wireless communication device further includes a memory device for storing at least one program, wherein the at least one program is executed by the second processor to disable the at least one feature of the wireless communication device.

8. The system of claim 7, wherein the memory device includes at least one other program, and the at least one program is executed by the second processor to prevent the at least one other program from being executed.

9. The system of claim 7, wherein the at least one program is executed by the second processor to disable at least a portion of at least one of the keyboard and the display.

10. The system of claim 1, wherein the step of disabling at least one feature includes at least limiting outgoing hand-held telephone calls to only one emergency telephone number.

11. The system of claim 1, wherein the second processor is configured to disable at least one feature by disabling at least one of an antenna of the wireless communication device, a keyboard of the wireless communication device, the display, and a power-on voltage of the wireless communication device.

12. The system of claim 1, wherein the wireless communication device is further configured to be selectively connected via a wired connection to the wireless transmission device, and the second processor is further configured to (i) disable a plurality of features of the wireless communication device if the information indicates that the wireless IR signal has been received and the wired connection is disconnected from at least one of the wireless communication device and the wireless transmission device, and (ii) enable at least one the plurality of features of the wireless communication device if the wired connection is connected to both the wireless communication device and the wireless transmission device.

13. A method for limiting usage of a wireless communication device, comprising:
sensing at least one state of a vehicle;
determining whether the at least one state includes a restricted state;
transmitting a particular wireless infrared (IR) signal toward at least a driver seat of the vehicle if the vehicle is in the restricted state;
receiving by a wireless communication device at least one wireless IR signal;
determining by the wireless communication device whether the at least one wireless IR signal is the particular wireless IR signal; and
disabling by the wireless communication device at least one feature of the wireless communication device if the particular wireless IR signal has been received by the wireless communication device.

14. The method of claim 13, wherein the step of determining whether the at least one state includes a restricted state, further includes determining whether a state of the vehicle includes at least one of a transmission of the vehicle being in gear, the vehicle moving in at least a forward direction, and the vehicle traveling at a speed that is above a predetermined speed.

15. The method of claim 13, wherein the step of transmitting a particular wireless IR signal toward at least a driver seat of the vehicle, further includes activating at least one IR light emitting diode (LED) to generate a detection zone that is substantially limited to the driver seat of the vehicle.

16. The method of claim 13, wherein the step of disabling at least one feature of the wireless communication device if the particular wireless IR signal has been received, further includes limiting at least outgoing hand-held telephone calls to 911.

17. The method of claim 16, wherein the step of disabling at least one feature of the wireless communication device if the particular wireless IR signal has been received, further includes disabling at least physically interacting with the wireless communication device to read an incoming text message and physically interacting with the wireless communication device to compose an outgoing text message.

18. The method of claim 13, wherein the step of disabling at least one feature of the wireless communication device if the particular wireless IR signal has been received, further includes limiting outgoing telephone calls to only 911.

19. The method of claim 13, wherein the step of disabling at least one feature of the wireless communication device if the particular wireless IR signal has been received, further includes disabling a plurality of features of the wireless communication device if the particular IR signal has been received, and enabling at least one of the plurality of features of the wireless communication device if a signal is provided to the wireless communication device via a wired connection between the wireless communication device and the vehicle.

20. A system for limiting usage of a cellular telephone, comprising:
a wireless transmission device mounted in a vehicle, comprising:
at least one sensor configured to identify at least one state of the vehicle;
an infrared (IR) modulation circuit configured to transmit a wireless IR signal in response to an activation signal; and
a first processor in communication with the IR modulation circuit and the at least one sensor, the first processor being configured to receive the at least one state of the vehicle from the at least one sensor, determine if the at least one state of the vehicle is a restricted state, and if it is, transmit the activation signal to the IR modulation circuit, wherein the restricted state is based on at least one of a speed of the vehicle, a state of a transmission of the vehicle, and a state of at least one brake of the vehicle; and
a cellular telephone comprising:
a display;
at least one of a hard and soft keyboard;
an IR modulation detection circuit for receiving the wireless IR signal; and
a second processor in communication with the display, the keyboard, and the IR modulation detection circuit, the second processor being configured to receive information from the IR modulation detection circuit and to disable a plurality of features of the cellular telephone if the information indicates that the wireless IR signal has been received, including physically interacting with the keyboard of the cellular telephone to initiate a telephone call and physically interacting with the keyboard of the cellular telephone to at least one of generate and send a text message.

* * * * *